(12) United States Patent
Wang et al.

(10) Patent No.: US 12,731,208 B2
(45) Date of Patent: Sep. 8, 2026

(54) DATA TRANSMISSION METHOD AND RELATED DEVICE FOR VIRTUAL REALITY SYSTEM

(71) Applicants: Beijing BOE Optoelectronics Technology Co., Ltd., Beijing (CN); BOE TECHNOLOGY GROUP CO., LTD., Beijing (CN)

(72) Inventors: Xuefeng Wang, Beijing (CN); Wenyu Li, Beijing (CN); Jinghua Miao, Beijing (CN); Xi Li, Beijing (CN); Longhui Wang, Beijing (CN); Zihe Liu, Beijing (CN); Lili Chen, Beijing (CN); Hao Zhang, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 183 days.

(21) Appl. No.: 18/643,050

(22) Filed: Apr. 23, 2024

(65) Prior Publication Data

US 2024/0273671 A1 Aug. 15, 2024

Related U.S. Application Data

(63) Continuation-in-part of application No. 17/921,292, filed as application No. PCT/CN2021/104473 on Jul. 5, 2021, now Pat. No. 12,223,571.

(30) Foreign Application Priority Data

Aug. 26, 2020 (CN) ......................... 202010872960.2

(51) Int. Cl.
*G06T 3/40* (2024.01)
*G06F 3/14* (2006.01)

(52) U.S. Cl.
CPC . *G06T 3/40* (2013.01); *G06F 3/14* (2013.01)

(58) Field of Classification Search
CPC ........ G06F 3/14; G06F 3/012; G06F 3/04847; G06T 3/40; G06T 3/4053; G06T 7/11;
(Continued)

(56) References Cited

U.S. PATENT DOCUMENTS

2002/0141614 A1 10/2002 Lin
2013/0083071 A1 4/2013 Nakamura
(Continued)

FOREIGN PATENT DOCUMENTS

CN 105892061 A 8/2016
CN 106226908 A 12/2016
(Continued)

OTHER PUBLICATIONS

Geisler et al., "A real-time foveated multiresolution system for low-bandwidth video communication," SPIE Proceedings, Jul. 17, 1998, p. 1-13, vol. 3299.
(Continued)

*Primary Examiner* — Xilin Guo
(74) *Attorney, Agent, or Firm* — HOUTTEMAN LAW LLC

(57) ABSTRACT

A data transmission method for a virtual reality system, the data transmission method including: performing, by a first processor, image sampling on an image to be transmitted to obtain a first image; performing, by the first processor, image sampling on the image to be transmitted to obtain a second image; transmitting, by the first processor, the first image and the second image to a virtual reality apparatus; receiving the first image and the second image by the virtual reality apparatus and processing the first image and the second image by the virtual reality apparatus to obtain an
(Continued)

image to be displayed; and displaying the image to be displayed by the virtual reality apparatus.

14 Claims, 7 Drawing Sheets

(58) Field of Classification Search
CPC ............ G06T 2207/20221; G06T 1/20; G09G 2340/12; G09G 2370/022; G09G 2350/00; G09G 2360/08; G09G 2340/0407; G09G 5/391
See application file for complete search history.

(56) References Cited

U.S. PATENT DOCUMENTS

| | | | | |
|---|---|---|---|---|
| 2018/0137602 | A1* | 5/2018 | Spitzer | G06T 11/001 |
| 2018/0356886 | A1 | 12/2018 | Li | |
| 2019/0122642 | A1* | 4/2019 | Morein | H04N 13/383 |
| 2021/0278678 | A1 | 9/2021 | Brannan | |
| 2022/0232269 | A1* | 7/2022 | Ninan | H04N 21/2353 |

FOREIGN PATENT DOCUMENTS

| | | | |
|---|---|---|---|
| CN | 107065197 | A | 8/2017 |
| CN | 107317987 | A | 11/2017 |
| CN | 110913198 | A | 3/2020 |
| CN | 110913199 | A | 3/2020 |
| CN | 112015273 | A | 12/2020 |

OTHER PUBLICATIONS

Vinnikov et al., "Gaze-Contingent Auditory Displays for Improved Spatial Attention in Virtual Reality," ACM Transactions on Computer-Human Interaction, Apr. 2017, p. 19:1 to 19:38, vol. 24, No. 3.
Wang, Shulu, "Research on three-dimensional display based on human visual specialties," Doctoral Dissertation, Oct. 8, 2016, Univ. of Science & Technology of China, Hefei, Anhui Province, China. English Abstract.
China Patent Office, First Office Action issued Jul. 22, 2023 for application No. CN202010872960.2.
China Patent Office, Second Office Action issued Oct. 25, 2023 for application No. CN202010872960.2.
WIPO, International Search Report issued Oct. 8, 2021 for application No. PCT/CN2021/104473.
USPTO, First Office Action, issued May 24, 2024, U.S. Appl. No. 17/921,292.

* cited by examiner

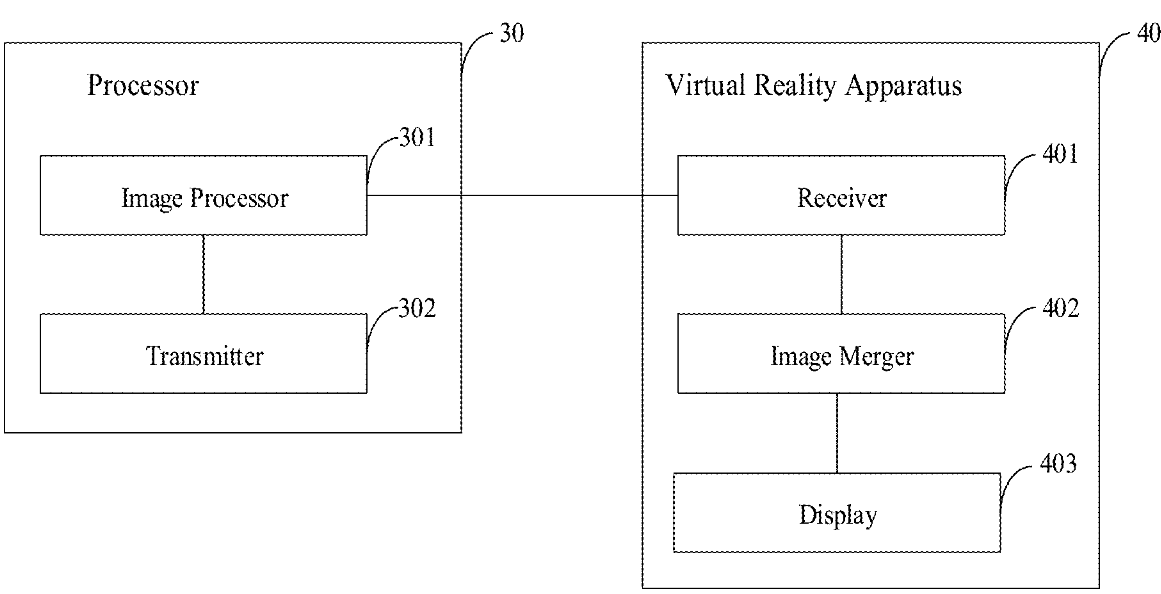

FIG. 10

S601
The transmission bandwidth meets the display requirements? The processing capacity meets the display requirements?

S602
The case where neither the transmission bandwidth nor the processing capacity meets the display requirements corresponds to the embodiments of FIGS. 1 to 10

S603
In response to determining that the transmission bandwidth meets the display requirements but the processing capacity does not meet the display requirements, rendering the first and second images at different rendering resolutions, stretching the second image, merging the first and stretched second images together, and synchronously transmitting the first and stretched second images which are merged together S604
In response to determining that the transmission bandwidth does not meet the display requirements but the processing capacity meets the display requirements, directly rendering the portion of the image to be transmitted in the display area, capturing the first image with a higher resolution from the portion of the rendered image to be transmitted in the preset area according to the gazed-at point information, and compressing the portion of the rendered image to be transmitted in the display area into the second image with a lower resolution S605
In response to determining that both the transmission bandwidth and the processing capacity meet the display requirements, directly transmitting the image to be transmitted to the virtual reality apparatus at the refresh rate of the virtual reality apparatus and the resolution of the image to be transmitted

FIG. 11

DATA TRANSMISSION METHOD AND RELATED DEVICE FOR VIRTUAL REALITY SYSTEM

CROSS REFERENCE TO RELATED APPLICATIONS

This is a Continuation-In-Part of U.S. patent application Ser. No. 17/921,292, filed Oct. 25, 2022, which is a National Phase Application filed under 35 U.S.C. 371 as a national stage of PCT/CN2021/104473 filed on Jul. 5, 2021, an application claiming priority to Chinese patent application No. 202010872960.2, entitled “data transmission method and related device for virtual reality system”, and filed in the Chinese patent office on Aug. 26, 2020, the entire content of each of which is incorporated herein by reference.

TECHNICAL FIELD

The present disclosure relates to field of display technology, and in particular, to a data transmission method and a related device for a virtual reality system.

BACKGROUND

Virtual Reality (VR) technology is an emerging field of technology in recent years. VR display belongs to a near-eye display (or near-to-eye display) field. In order to prevent a user from experiencing a screen door effect and allow the user to achieve an immersive experience, it is required that a VR display screen has a high resolution and a high refresh rate, which results in the problem of increased transmission bandwidth of a virtual reality system.

SUMMARY

A first aspect of the present disclosure provides a data transmission method for a virtual reality system, the data transmission method including:

performing, by a first processor, image sampling on an image to be transmitted to obtain a first image;

performing, by the first processor, image sampling on the image to be transmitted to obtain a second image;

transmitting, by the first processor, the first image and the second image to a virtual reality apparatus;

receiving the first image and the second image by the virtual reality apparatus and processing the first image and the second image by the virtual reality apparatus to obtain an image to be displayed; and displaying the image to be displayed by the virtual reality apparatus.

In some embodiments, the first processor includes any one of a processor of a virtual reality host communicating with the virtual reality apparatus, a processor of a cloud server, or a processor of the virtual reality apparatus.

In some embodiments, the performing, by a first processor, image sampling on an image to be transmitted to obtain a first image includes: performing, by the first processor, image sampling on a preset area of the image to be transmitted with a preset first resolution and a preset first field angle to obtain the first image;

the performing, by the first processor, image sampling on the image to be transmitted to obtain a second image includes: performing, by the first processor, image sampling on a display area of the image to be transmitted with a preset second resolution and a preset second field angle to obtain the second image, wherein the first resolution and the second resolution are equal to each other, the first field angle is less than the second field angle, and the preset area is a portion of the display area; and the transmitting, by the first processor, the first image and the second image to a virtual reality apparatus includes: transmitting, by the first processor, the first image and the second image to the virtual reality apparatus in a certain order.

In some embodiments, the performing, by a first processor, image sampling on an image to be transmitted to obtain a first image includes: performing, by the first processor, image sampling on a preset area of the image to be transmitted with a preset first resolution and a preset first field angle to obtain the first image;

the performing, by the first processor, image sampling on the image to be transmitted to obtain a second image includes: performing, by the first processor, image sampling on a display area of the image to be transmitted with a preset second resolution and a preset second field angle to obtain the second image, wherein the first resolution is greater than the second resolution, the first field angle is less than the second field angle, and the preset area is a portion of the display area; and the transmitting, by the first processor, the first image and the second image to a virtual reality apparatus includes: stretching the second image, merging the first image with a stretched second image, and synchronously transmitting the first image and the stretched second image which are merged together to the virtual reality apparatus.

In some embodiments, the performing, by a first processor, image sampling on an image to be transmitted to obtain a first image includes: performing, by the first processor, image sampling on a display area of the image to be transmitted with a preset first resolution and a preset second field angle to obtain an intermediate image, and capturing a portion of the intermediate image in a preset area within the display area to obtain the first image;

the performing, by the first processor, image sampling on the image to be transmitted to obtain a second image includes: compressing, by the first processor, the intermediate image with a preset second resolution to have a size of the preset area, to obtain the second image having a preset first field angle, wherein the first resolution is greater than the second resolution, and the first field angle is less than the second field angle; and the transmitting, by the first processor, the first image and the second image to a virtual reality apparatus includes: transmitting, by the first processor, the first image and the second image to the virtual reality apparatus in a certain order.

In some embodiments, the certain order includes a periodical transmission in which k first images Q1 are transmitted continuously and then one second image Q2 is transmitted in sequence, where k is an integer greater than 1;

or the certain order includes a periodical transmission in which M first images Q1 are transmitted continuously and then one second image Q2 is transmitted in sequence, where $1 \leq M < k$.

In some embodiments, the certain order includes a periodical transmission in which k first images Q1 are transmitted continuously and then one second image Q2 is transmitted in sequence, where k is an integer greater than 1; and the first processor determines a similarity between any two adjacent second images, increases a value of k in response to the similarity being greater than a given threshold, and decreases the value of k in response to the similarity being less than or equal to the given threshold.

In some embodiments, the receiving the first image and the second image by the virtual reality apparatus and processing the first image and the second image by the virtual reality apparatus to obtain an image to be displayed includes:

stretching the second image by the virtual reality apparatus, and merging the first image with a stretched second image by the virtual reality apparatus to obtain the image to be displayed.

In some embodiments, the performing, by the first processor, image sampling on a preset area of the image to be transmitted with a preset first resolution and a preset first field angle to obtain the first image includes: performing, by the first processor, image sampling on the preset area of the image to be transmitted with the preset first resolution, the preset first field angle, and a first refresh rate to obtain the first image; and the performing, by the first processor, image sampling on a display area of the image to be transmitted with a preset second resolution and a preset second field angle to obtain the second image includes: performing, by the first processor, image sampling on the display area of the image to be transmitted with the preset second resolution, the preset second field angle, and a second refresh rate to obtain the second image, wherein the first refresh rate is greater than or equal to the second refresh rate.

A second aspect of the present disclosure provides a data transmission method for a virtual reality system, the data transmission method including:

performing image sampling on a preset area of an image to be transmitted with a preset first resolution and a preset first field angle to obtain a first image;

performing image sampling on a display area of the image to be transmitted with a preset second resolution and a preset second field angle to obtain a second image, wherein the first resolution and the second resolution are equal to each other, the first field angle is less than the second field angle, and the preset area is a portion of the display area; and transmitting the first image and the second image to a virtual reality apparatus in a certain order.

In some embodiments, the performing image sampling on a preset area of an image to be transmitted with a preset first resolution and a preset first field angle to obtain a first image includes: performing image sampling on the preset area of the image to be transmitted with the preset first resolution, the preset first field angle, and a first refresh rate to obtain the first image; and the performing image sampling on a display area of the image to be transmitted with a preset second resolution and a preset second field angle to obtain a second image includes: performing image sampling on the display area of the image to be transmitted with the preset second resolution, the preset second field angle, and a second refresh rate to obtain the second image;

wherein the first refresh rate is greater than or equal to the second refresh rate.

In some embodiments, the first refresh rate and the second refresh rate are determined as follows:

the first refresh rate of the first image and the second refresh rate of the second image are determined according to a refresh rate of the virtual reality apparatus and attitude information of the virtual reality apparatus.

In some embodiments, the transmitting the first image and the second image to the virtual reality apparatus in the certain order includes:

arranging frames of the first image and the second image according to the first refresh rate and the second refresh rate to obtain an image sequence including the first image and the second image, and transmitting the image sequence to the virtual reality apparatus.

In some embodiments, the performing image sampling on a preset area of an image to be transmitted with a preset first resolution and a preset first field angle to obtain a first image and the performing image sampling on a display area of the image to be transmitted with a preset second resolution and a preset second field angle to obtain a second image include: adding flag bit information into the first image and the second image, respectively, wherein the flag information is configured to distinguish the first image and the second image from each other.

A third aspect of the present disclosure provides a data transmission method for a virtual reality system, the data transmission method including:

receiving a first image and a second image, wherein the first image is obtained through performing image sampling on a preset area of an image to be transmitted with a preset first resolution and a preset first field angle, the second image is obtained through performing image sampling on a display area of the image to be transmitted with a preset second resolution and a preset second field angle, the first resolution and the second resolution are equal to each other, the first field angle is less than the second field angle, and the preset area is a portion of the display area;

processing the first image and the second image to obtain an image to be displayed; and displaying the image to be displayed.

In some embodiments, the processing the first image and the second image to obtain an image to be displayed includes: stretching the second image, and merging the first image with a stretched second image to obtain the image to be displayed.

In some embodiments, the second image includes position information, and the first image is merged with the stretched second image based on the position information.

In some embodiments, the first image and the second image include flag bit information, respectively, for distinguishing the first image and the second image from each other;

the receiving a first image and a second image includes:

receiving the first image and the second image, and distinguishing the first image and the second image from each other according to the flag bit information; and storing the first image in a first memory, and storing the second image in a second memory;

the processing the first image and the second image to obtain an image to be displayed includes:

obtaining the first image and the second image from the first memory and the second memory, respectively;

stretching the second image; and merging the first image with the stretched second image to obtain the image to be displayed.

A fourth aspect of the present disclosure provides a virtual reality system, including: any one of the processors described above and any one of the virtual reality apparatuses described above.

BRIEF DESCRIPTION OF THE DRAWINGS

FIG. 10 is a schematic structural diagram of a virtual reality system according to an embodiment of the present disclosure;

FIG. 11 is a schematic flowchart of determining whether both a transmission bandwidth of a virtual reality system and the processing capacity of a processor of the virtual reality system meet the display requirements of a virtual reality apparatus of the virtual reality system, and performing different image processing and transmission based on the determination results thereof, according to an embodiment of the present disclosure;

DETAILED DESCRIPTION OF EMBODIMENTS

Figure 1:
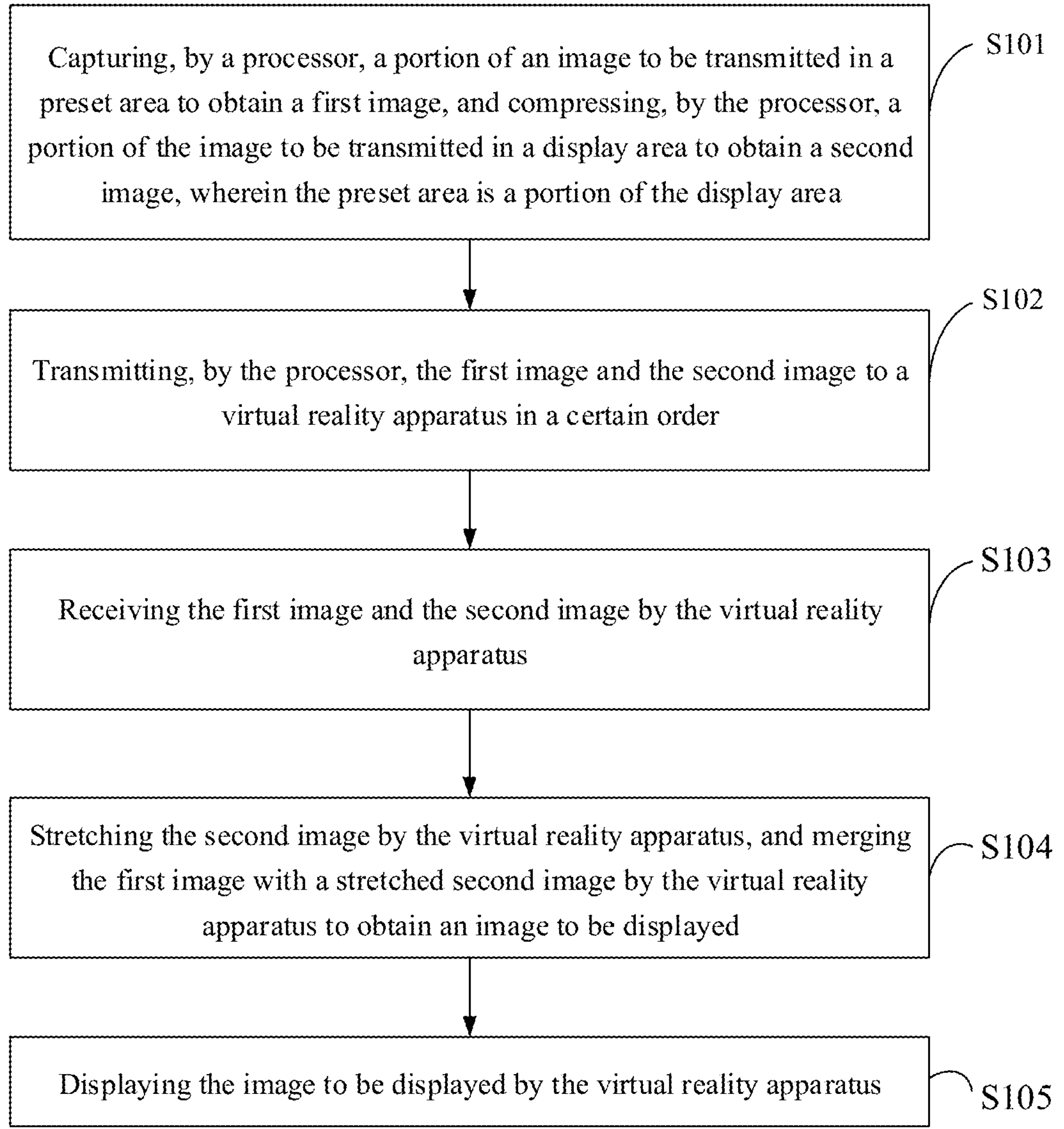
FIG. 1 is a first flowchart of a data transmission method for a virtual reality system according to an embodiment of the present disclosure.

In view of the problem that a transmission bandwidth of a virtual reality system in the related art is large, embodiments of the present disclosure provide a data transmission method and a related device for a virtual reality system.

Exemplary embodiments of the data transmission method and the related device for a virtual reality system according to the embodiments of the present disclosure will be described below in detail with reference to the accompanying drawings. The sizes and shapes of various parts shown in the drawings are not necessary to scale, but are merely for illustrating the present disclosure.

An embodiment of the present disclosure provides a data transmission method for a virtual reality system, as shown in FIG. 1, the data transmission method includes steps S101 to S105.

Step S101 includes capturing (e.g., sampling), by a processor, a portion of an image to be transmitted in a preset area to obtain a first image, and compressing, by the processor, a portion of the image to be transmitted in a display area to obtain a second image, where the preset area is a portion of the display area.

Step S102 includes transmitting, by the processor, the first image and the second image to a virtual reality apparatus in a certain order.

Step S103 includes receiving the first image and the second image by the virtual reality apparatus.

Step S104 includes, by the virtual reality apparatus, stretching the second image, and merging (or fusing) the first image with the stretched second image to obtain an image to be displayed.

Step S105 includes displaying the image to be displayed by the virtual reality apparatus.

In the data transmission method for the virtual reality system according to the present embodiment, the processor obtains the first image by capturing the portion of the image to be transmitted in the preset area, obtains the second image by compressing the portion of the image to be transmitted in the display area, and transmits the first image and the second image in the certain order. Since a data amount of the first image and a data amount of the second image are each smaller than a data amount of the image to be transmitted, the transmission bandwidth is greatly reduced. Further, the virtual reality apparatus can stretch the received second image, and merge the stretched second image with the received first image, to obtain the image to be displayed that meets the display requirement of a virtual reality system. As such, the data transmission method according to the present embodiment can greatly reduce the transmission bandwidth and improve the user experience, on the basis of meeting the display requirement of the virtual reality system.

Figure 2:
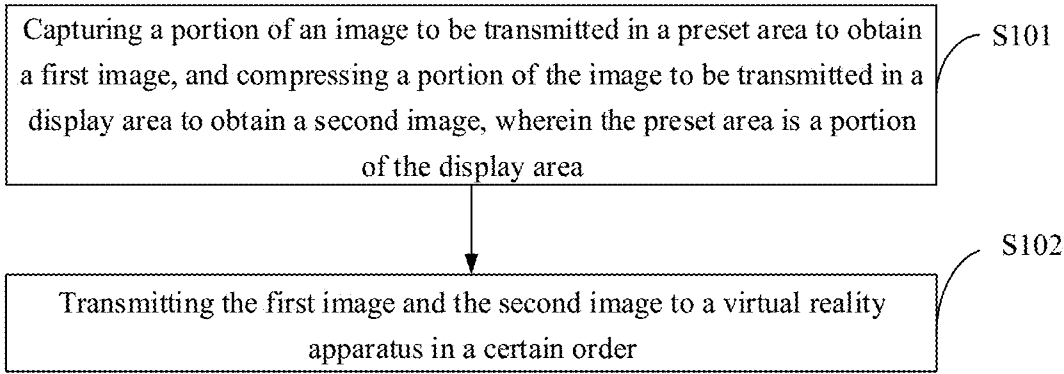
FIG. 2 is a second flowchart of a data transmission method for a virtual reality system according to an embodiment of the present disclosure.

Based on the same inventive concept, an embodiment of the present disclosure further provides a data transmission method for a virtual reality system, as shown in FIG. 2, this data transmission method may include the following steps S101 and S102.

Step S101 includes capturing (e.g., sampling) a portion of an image to be transmitted in a preset area to obtain a first image, and compressing a portion of the image to be transmitted in a display area to obtain a second image, where the preset area is a portion of the display area.

Step S102 includes transmitting the first image and the second image to a virtual reality apparatus in a certain order.

In the data transmission method for the virtual reality system according to the present embodiment, a processor obtains the first image by capturing the portion of the image to be transmitted in the preset area, obtains the second image by compressing the portion of the image to be transmitted in the display area, and transmits the first image and the second image in the certain order. Since a data amount of the first image and a data amount of the second image are each smaller than a data amount of the image to be transmitted, the transmission bandwidth is greatly reduced.

In an embodiment of the present disclosure, the data transmission method shown in each of FIG. 1 and FIG. 2 may be executed on a processor, which may be in communication connection with the virtual reality apparatus in a wired or wireless manner. For example, the processor may be a processor (which may be referred to as a "first processor") of a computer, a mobile phone, a tablet computer, or another apparatus, which has a processing function and collaborates with the virtual reality apparatus; in this case, the first processor is located outside the virtual reality apparatus, and the virtual reality apparatus may be referred to as a "separate apparatus". Alternatively, the first processor may be integrated into the virtual reality apparatus; in this case the first processor is located within the virtual reality apparatus, and the virtual reality apparatus may be referred to as an "all-in-one apparatus". In a case where the virtual reality apparatus is the all-in-one apparatus and adopts cloud rendering technology (i.e., adopts a processor (which may be referred to as a "second processor") of a cloud server to render an image), whether the processing capability meets the display requirements to be described below and in FIG. 11 refers to a processing capability of the processor of the cloud server. In the case where the virtual reality apparatus is the separate apparatus and in a case where the virtual reality apparatus is the all-in-one apparatus but does not adopt the cloud rendering technology, whether the processing capability meets the display requirements to be described below and in FIG. 11 refers to a processing capability of the first processor.

Figure 3:
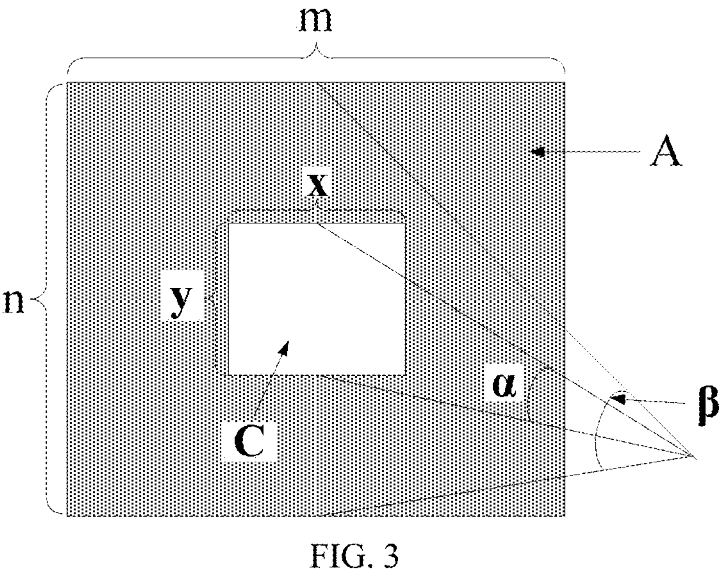
FIG. 3 is a schematic diagram of an image to be transmitted according to an embodiment of the present disclosure.

FIG. 3 is a schematic diagram of an image to be transmitted according to an embodiment of the present disclosure. As shown in FIG. 3, a resolution of the display area A is m×n. In the step S101, a portion of the image to be transmitted in the preset area is captured (e.g., cut out), for example, the portion in the area C in FIG. 3 is captured, to obtain a first image with a resolution of x×y. A definition of the obtained first image is the same as a definition of the portion of the image to be transmitted in the area C, such that the definition of the obtained first image is not changed, i.e., the first image is still a high definition image. Further, the data amount of the first image is smaller than the data amount of the image to be transmitted. The portion of the image to be transmitted in the display area is compressed to obtain the second image, and the data amount of the second image is smaller than that of the image to be transmitted because the second image is obtained by compressing the image to be transmitted. Further, a definition of the second image is smaller than that of the image to be transmitted.

Figure 4:
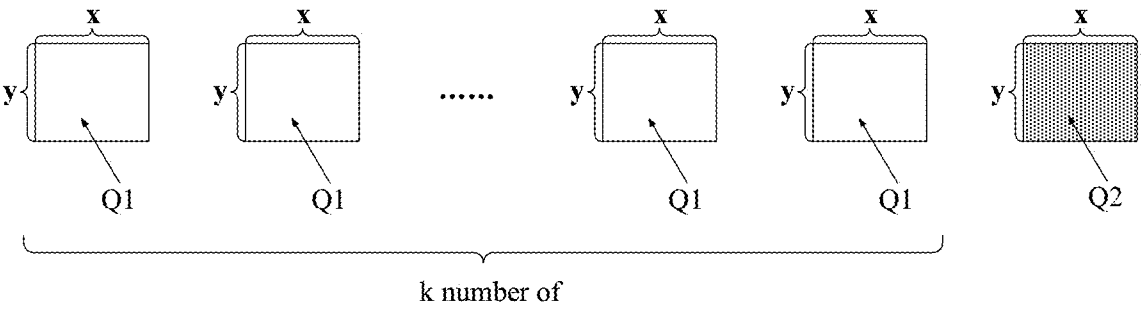
FIG. 4 is a first schematic diagram illustrating a transmission order (or transmission sequence) of a first image and a second image according to an embodiment of the present disclosure.
Figure 5:
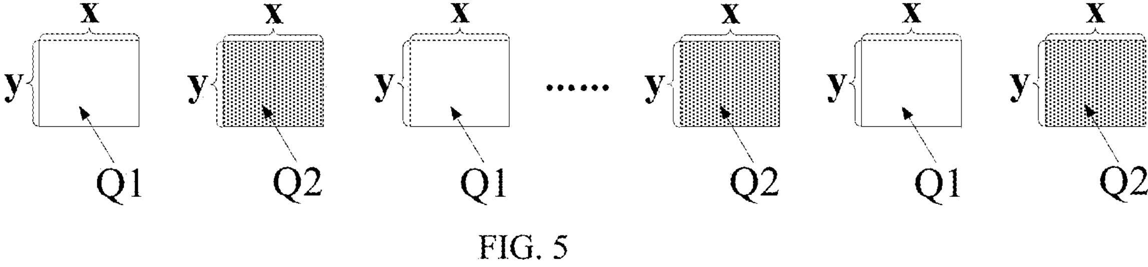
FIG. 5 is a second schematic diagram illustrating a transmission order of a first image and a second image according to an embodiment of the present disclosure.

In the step S102, the first image and the second image are transmitted to the virtual reality apparatus in a certain order. That is, in the transmission process, the first image and the second image are not transmitted simultaneously, and for example, the first image and the second image may be transmitted in the order as shown in FIG. 4 or FIG. 5. Since each of the data amount of the first image and the data amount of the second image is smaller than the data amount of the image to be transmitted, the transmission bandwidth is greatly reduced.

After the first image and the second image are received, the second image is stretched, and the stretched second image is merged with the first image, to obtain an image to be displayed. In the image to be displayed, an image (i.e., the first image) corresponding to the preset area is an image with a higher definition, and an image (i.e., the second image) corresponding the display area including the present area is an image with a lower definition. In a specific implementation, when a user uses the virtual reality apparatus, eyes of the user mainly pay attention to a portion of a screen, for example, a central area of the screen, and when the user wants to watch the surrounding environment, the user mainly watches the surrounding environment by turning his head instead of turning his eyeballs. As such, the image to be displayed obtained in an embodiment of the present disclosure meets the requirement on the definition of an image. Further, the transmission bandwidth can be reduced, and a time delay in the image transmission process is reduced, thereby making the picture watched by the user smoother, and improving the user experience.

Specifically, in the data transmission method according to an embodiment of the present disclosure, the step S101 may include steps of:

- referring to FIG. 3, performing image sampling on the preset area C of the image to be transmitted with a preset first resolution, a preset first field angle α, and a preset first refresh rate r1 to obtain the first image. In a specific implementation, the preset area C may be a gazing area when the user watches the screen, for example, the preset area C may be a central area of the display area A;
- performing image sampling on the display area A of the image to be transmitted with a preset second resolution, a preset second field angle β, and a preset second refresh rate r2 to obtain the second image;
- where the first resolution and the second resolution are equal to each other (e.g., are each equal to x×y), the first field angle α is less than the second field angle β, and the first refresh rate r1 is greater than or equal to the second refresh rate r 2.

During the sampling process, with reference to FIG. 3, through combining the first field angle α and the second field angle β, where the first field angle α may be a viewing angle at which the user views the preset area C, and the second field angle β may be a viewing angle at which the user views the display area A, the image to be displayed obtained through subsequent merging by the virtual reality apparatus is more suitable for the viewing angle of the user, and the immersive experience can be realized. Since the first image corresponds to the user's gazing area and the second image corresponds to a peripheral area, the second refresh rate r2 may be less than the first refresh rate r1 to ensure that the user's gazing area has a higher definition.

Further, the first image and the second image have the same resolution, such that the resolution of each of the images in the transmission process is constant, and the fluency of the transmission process is ensured. For example, taking the resolution of the display area A as m×n and the first resolution as x×y as an example, if the image to be transmitted is directly transmitted, the transmission bandwidth thereof is m×n×r; in contrast, in the present embodiment, the transmission bandwidth for transmitting the first image and the second image is x×y×r, where r represents the refresh rate of the virtual reality apparatus; and it can be seen that the transmission bandwidth in the present embodiment is significantly reduced, where the compression ratio of the transmission bandwidth is (m×n)/(x×y). In addition, the sampling resolution of the first image and the sampling resolution of the second image are equal to each other, but a sampling area of the second image is larger than a sampling area of the first image, and thus the resultant first image has a higher definition than a definition of the resultant second image.

In a specific implementation, in the data transmission method according to each of the above embodiments of the present disclosure, the first refresh rate and the second refresh rate may be determined as follows:

- determining the first refresh rate of the first image and the second refresh rate of the second image according to a refresh rate of the virtual reality apparatus and attitude information of the virtual reality apparatus.

In a specific implementation, a sensor such as a gyroscope is generally arranged in the virtual reality apparatus, the virtual reality apparatus may obtain the attitude information through the sensor such as the gyroscope, and determine whether the virtual reality apparatus is in a motion state or a static state according to the attitude information. For example, a corresponding threshold value may be set, if the attitude information is greater than the threshold value, the virtual reality apparatus is in the motion state, and if the attitude information is less than the threshold value, the virtual reality apparatus is in the static state. If the virtual reality apparatus is in the motion state, due to the motion blur of human eyes, the sensitivity of human eyes to the definition of a picture is reduced, and in this case, a proportion of the first image in an image sequence may be reduced, that is, the first refresh rate of the first image may be reduced, for example, the first image Q1 and the second image Q2 may be transmitted in an alternate manner as shown in FIG. 5, i.e., the first refresh rate may be equal to the second refresh rate. If the virtual reality apparatus is in the static state, since the sensitivity of human eyes to the definition of a picture is increased, the first refresh rate of the first image needs to be increased; in this case, the proportion of the first image in the image sequence needs to be increased, and for example, a periodical transmission may be performed in which k first images Q1 are transmitted continuously and then one second image Q2 is transmitted in the sequence as shown in FIG. 4, where k is an integer greater than 1, i.e., the first refresh rate is greater than the second refresh rate.

In a specific implementation, at least two transmission modes may be preset, for example, two transmission modes may be preset, in which a first transmission mode is applicable to the motion state, where the first refresh rate is equal to the second refresh rate, and a second transmission mode is applicable to the static state, where the first refresh rate is greater than the second refresh rate. Specific values of the first refresh rate and the second refresh rate in each transmission mode may be determined according to the refresh rate of the virtual reality apparatus. Alternatively, additional transmission modes may also be set, which is not limited herein. In a specific implementation, in step S101, the preset area may be sampled according to the determined first refresh rate to obtain the first image, and the display area may be sampled according to the second refresh rate to obtain the second image, such that the finally formed image to be displayed is more suitable for the current state of the user.

In a specific implementation, in the data transmission method according to each of the above embodiments of the present disclosure, the step S102 may include steps of:

arranging frames of the first image and the second image according to the first refresh rate and the second refresh rate to obtain an image sequence including the first image and the second image, and transmitting the image sequence to the virtual reality apparatus.

In a display process of the virtual reality apparatus, a picture displayed on a screen is constantly changed, and in order to ensure the continuity of the pictures displayed on the virtual reality apparatus, the processor needs to continuously transmit the first image and the second image to the virtual reality apparatus. Specifically, the frames of the first image and the second image may be arranged according to the refresh rate of the virtual reality apparatus, where a sum of the refresh rate (i.e., a first refresh rate r1) of the first image and the refresh rate (i.e., a second refresh rate r2) of the second image is the refresh rate of the virtual reality apparatus, i.e., r=r1+r2, r represents the refresh rate of the virtual reality apparatus, r1 represents the refresh rate of the first image, and r2 represents the refresh rate of the second image. For example, if the refresh rate of the virtual reality apparatus is 90 Hz, i.e., 90 refreshes per second, 9 frames of the first image and one frame of the second image may be transmitted periodically, where the refresh rate of the first image is 81 Hz and the refresh rate of the second image is 9 Hz. As shown in FIG. 4, a periodical transmission may be performed in which k first images Q1 are transmitted continuously and then one second images Q2 is transmitted in such a sequence. Alternatively, as shown in FIG. 5, the first images Q1 and the second images Q2 may be transmitted alternately.

In a specific implementation, a memory may be set in the processor to store the first image and the second image obtained in the step S101. For example, two memories may be set to store the first image and the second image, respectively, and a counter may be set in the processor. Taking that the refresh rate of the virtual reality apparatus is 90 Hz, and 9 frames of the first image and one frame of the second image are periodically transmitted in this order as an example, the processor may control the counter to count, read the memory addresses of the 9 frames of the first image at times 0 to 8, respectively, and sequentially transmit the frames of the first image, read the memory address of the one frame of the second image at time 9, and transmit the second image, and meanwhile, clear the counter, thereby completing transmission of the image sequence of one period.

In a specific implementation, in the data transmission method according to each of the above embodiments of the present disclosure, the step S101 may include a step of:

adding flag bit information into the first image and the second image, respectively, where the flag bit information is used for distinguishing the first image from the second image. For example, "a" number of data bits in the front of the first line of each of the first image and the second image may be set as flag data that serves as the flag information, or the flag bit information may be set at another position, which is not limited herein. Further, the flag information in the first image is different from the flag information in the second image, and thus the first image and the second image can be distinguished from each other by the flag information.

By adding the flag bit information into each of the first image and the second image, after receiving the image sequence, the virtual reality apparatus may identify the first image and the second image through the flag bit information, which is convenient for subsequent processing of the first image and the second image. In addition, in a specific implementation, a first memory and a second memory may be set in the virtual reality apparatus, and after identifying each image in the image sequence, the virtual reality apparatus may store the first image in the first memory, and store the second image in the second memory. Thus, in a subsequent process, the first image and the second image may be respectively obtained from the first memory and the second memory according to a corresponding sequence, thereby reducing a calculation amount in the subsequent process and avoiding omission of the first image or the second image.

Further, by setting the flag bit information in each of the first image and the second image, upon storing a new frame of image in the first memory and the second memory, the first memory and the second memory may discard the previous frame of image, and the first image and the second image stored in the first memory and the second memory are images required by the current frame. In this way, the first image and the second image can be directly obtained from the first memory and the second memory without considering the sequence of image frames, thereby reducing a data calculation amount.

Figure 6:
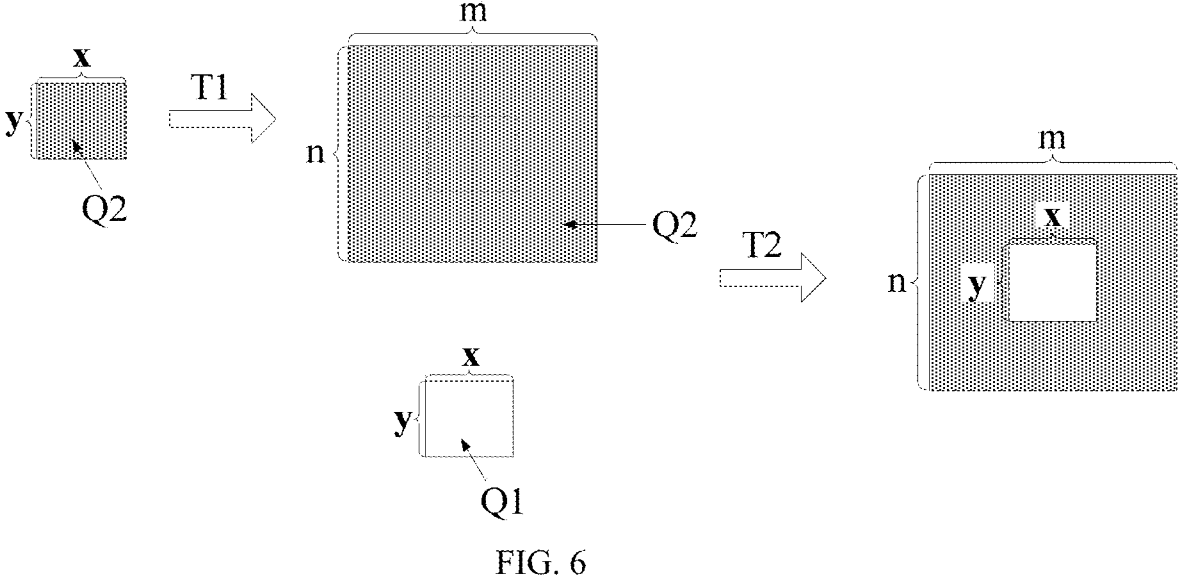
FIG. 6 is a schematic diagram illustrating a process of merging a first image with a second image by a virtual reality apparatus.

FIG. 6 is a schematic diagram illustrating a process of merging the first image with the second image by the virtual reality apparatus. As shown in FIG. 6, the virtual reality apparatus obtains the first image Q1 and the second image Q2 from the first memory and the second memory, respectively. The virtual reality apparatus stretches the second image Q2 in a process as shown by an arrow T1 in the figure, such that the resolution of the stretched second image Q2 is the same as a display resolution of the virtual reality apparatus, for example, the resolution of the second image Q2 is stretched from x×y to m×n as shown in the figure. As shown by an arrow T2 in the figure, The virtual reality apparatus merges the first image Q1 with the stretched second image Q2, by replacing the portion, which is shown by a dashed box, of the stretched second image Q2, that is, the first image Q1 is placed in a gazing area of the user, thereby obtaining an image to be displayed with a resolution of m×n through the merging. In addition, the image to be displayed may be processed by using a high definition fusion algorithm to blur a boundary between the first image and the second image.

Figure 7:
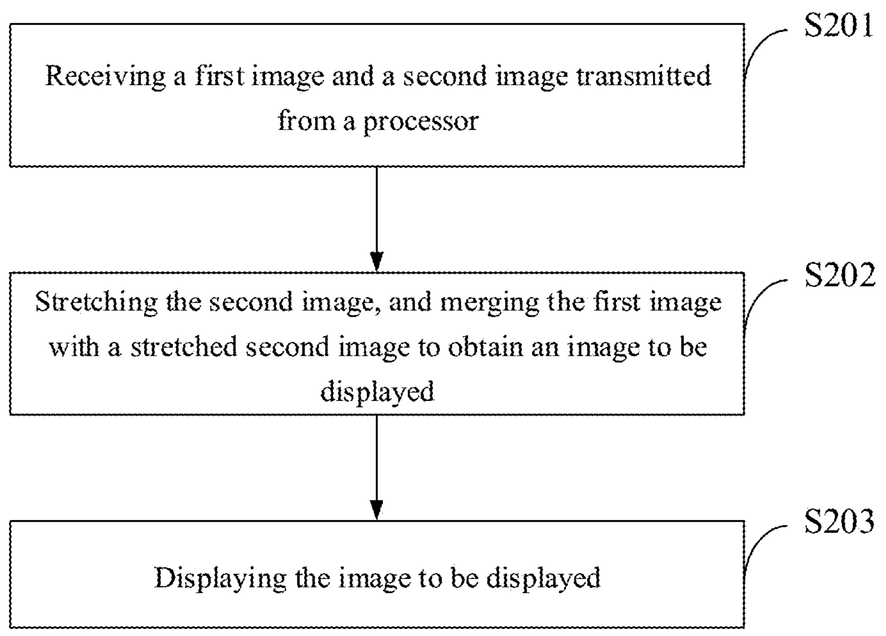
FIG. 7 is a third flowchart of a data transmission method for a virtual reality system according to an embodiment of the present disclosure.

Based on the same inventive concept, an embodiment of the present disclosure further provides a data transmission method for a virtual reality system, as shown in FIG. 7, the method may include the following steps S201 to S203.

Step S201 includes receiving a first image and a second image transmitted from a processor.

Step S202 includes stretching the second image, and merging the first image with the stretched second image to obtain an image to be displayed.

Step S203 includes displaying the image to be displayed.

In the data transmission method for the virtual reality system, the received first image is obtained by capturing the portion of the image to be transmitted in the preset area by the processor, and the received second image is obtained by compressing the portion of the image to be transmitted in the display area by the processor, such that the data amount of the first image and the data amount of the second image are both smaller than the data amount of the image to be transmitted, and the transmission bandwidth is greatly reduced. Moreover, the second image is stretched, and the stretched second image is merged (or fused) with the first image, such that the obtained image to be displayed can greatly reduce the transmission bandwidth and improve the user experience, on the basis of meeting the display requirement of a virtual reality system.

In an embodiment of the present disclosure, the data transmission method shown in FIG. 7 may be executed on the virtual reality apparatus.

Optionally, in the data transmission method according to the present embodiment, the step S201 may include steps of:

- receiving the first image and the second image, and distinguishing the first image and the second image from each other according to the flag bit information; and
- storing the first image in the first memory, and storing the second image in the second memory.

Since each of the first image and the second image is provided with the flag bit information, after receiving the first image and the second image, the virtual reality apparatus may identify the first image and the second image through the flag bit information, which is convenient to subsequent processing of the first image and the second image. In addition, in a specific implementation, the first memory and the second memory may be set in the virtual reality apparatus, and after identifying the images in an image sequence, the virtual reality apparatus may store the first image in the first memory, and store the second image in the second memory, such that in a subsequent process, the virtual reality apparatus may obtain the first image and the second image from the first memory and the second memory, respectively, according to a corresponding sequence, thereby reducing a calculation amount in the subsequent process and avoiding omission of the first image or the second image.

In a specific implementation, in the data transmission method according to the present embodiment, the step S202 may include steps of:

- obtaining the first image and the second image from the first memory and the second memory, respectively;
- referring to FIG. 6, in the process indicated by the arrow T1, stretching the second image Q2 to make the resolution of the stretched second image Q2 equal to the display resolution of the virtual reality apparatus, for example, the resolution of the second image Q2 is stretched from x×y to m×n as shown in the figure; and
- merging the first image Q1 with the stretched second image Q2 to obtain an image to be displayed, as in a process indicated by the arrow T2; for example, replacing the portion, which is indicated by the dashed box in the figure, of the stretched second image Q2 with the first image Q1, i.e., placing the first image Q1 in the gazing area of the user, thereby obtaining the image to be displayed with the resolution of m×n through the merging.

In addition, the image to be displayed may be processed by using the high definition fusion algorithm to blur the boundary between the first image and the second image, and specifically, the image to be displayed may be processed in the following first to third manners.

The first manner is weighted averaging that includes: comparing the pixel values on both sides of the boundary between the first image and the second image, and carrying out weighted average on the pixel values on both sides of the boundary.

The second manner is edge diffusing that includes: multiplexing (e.g., reusing) the pixel values of the first image outwardly to extend the boundary between the first image and the second image outwardly, such that the boundary between the first image and the second image is outside the gazing area of human eyes, the boundary is invisible to the human eyes in the gazing area, and peripheral vision of the human eyes cannot capture the boundary clearly.

The third manner is gradient blurring (or gradually blurring) that includes carrying out gradient blurring on a portion of the first image close to the boundary to reduce a definition difference between both sides of the boundary, such that the first image and the second image have better fusion (or merging) effect at the boundary, and the human eyes cannot feel the existence of the boundary when watching.

Based on the same inventive concept, an embodiment of the present disclosure further provides a processor whose principle of solving a problem is similar to that of the data transmission method as described above, thus implementation of the processor may be referred to the implementation of the data transmission method, and repeated description thereof is omitted herein.

Figure 8:
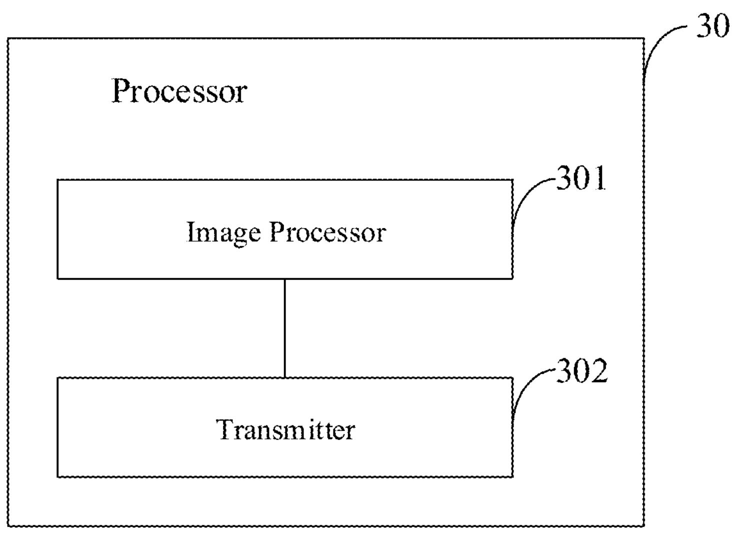
FIG. 8 is a schematic structural diagram of a processor according to an embodiment of the present disclosure.

FIG. 8 is a schematic structural diagram of a processor according to an embodiment of the present disclosure. As shown in FIG. 8, the processor 30 according to the present embodiment may include an image processor 301 and a transmitter 302.

The image processor 301 is configured to capture (e.g., cut out) the portion of the image to be transmitted in the preset area to obtain the first image, and compress the portion of the image to be transmitted in the display area to obtain the second image, where the preset area is a portion of the display area.

The transmitter 302 is configured to transmit the first image and the second image to a virtual reality apparatus in a certain order.

Optionally, in the processor according to the present embodiment, the image processor 301 is specifically configured to: perform image sampling on the preset area of the image to be transmitted with the preset first resolution, the preset first field angle, and the preset first refresh rate to obtain the first image, and perform image sampling on the display area of the image to be transmitted with the preset second resolution, the preset second field angle, and the preset second refresh rate to obtain the second image, where the first resolution and the second resolution are equal to each other, and the first refresh rate is greater than or equal to the second refresh rate.

Optionally, in the processor according to the present embodiment, the transmitter 302 is specifically configured to: determine the first refresh rate of the first image and the second refresh rate of the second image according to the refresh rate of the virtual reality apparatus and the attitude information of the virtual reality apparatus; arrange frames of the first image and the second image according to the first refresh rate and the second refresh rate to obtain an image sequence including the first image and the second image; and transmit the image sequence to the virtual reality apparatus.

Optionally, in the processor according to the present embodiment, the image processor 301 is further configured to: add flag bit information into the first image and the second image, respectively, where the flag bit information is used for distinguishing the first image and the second image from each other.

Based on the same inventive concept, an embodiment of the present disclosure further provides a virtual reality apparatus whose principle of solving a problem is similar to that of the data transmission method as described above, thus an implementation of the virtual reality apparatus may be referred to the implementation of the data transmission method, and repeated description thereof is omitted herein.

Figure 9:
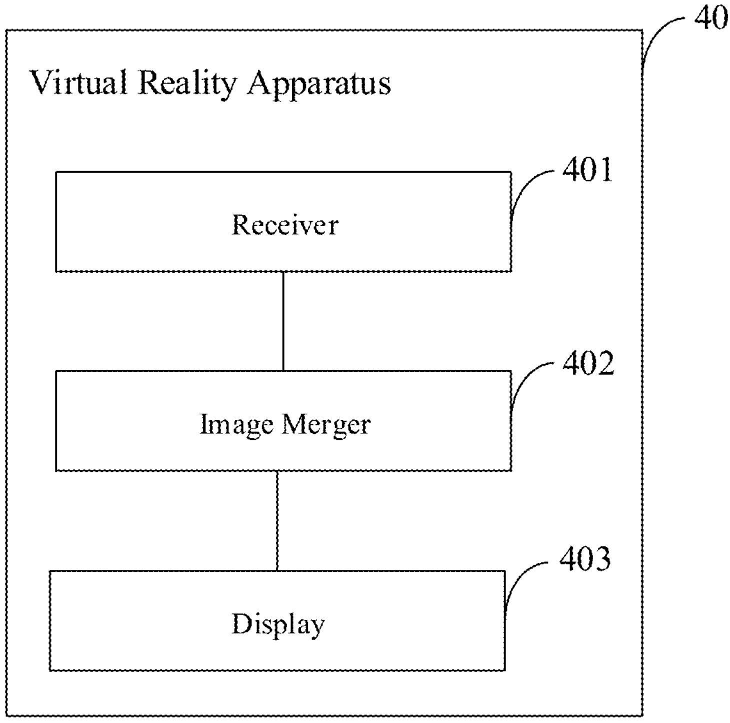
FIG. 9 is a schematic structural diagram of a virtual reality apparatus according to an embodiment of the present disclosure.

FIG. 9 is a schematic structural diagram of a virtual reality apparatus according to an embodiment of the present disclosure. As shown in FIG. 9, the virtual reality apparatus 40 according to the present embodiment may include a receiver 401, an image merger 402, and a display 403.

The receiver 401 is configured to receive the first image and the second image transmitted from the processor.

The image merger 402 is configured to stretch the second image, and merge the first image with the stretched second image to obtain the image to be displayed.

The display 403 is configured to display the image to be displayed.

Optionally, in the virtual reality apparatus according to the present embodiment, the receiver 401 is specifically configured to: receive the first image and the second image, and distinguish the first image and the second image from each other according to the flag bit information, store the first image in the first memory, and store the second image in the second memory.

Optionally, in the virtual reality apparatus according to the present embodiment, the image merger 402 is specifically configured to: obtain the first image and the second image from the first memory and the second memory, respectively; stretch the second image to make the resolution of the stretched second image equal to the display resolution of the virtual reality apparatus; and merge the first image with the stretched second image to obtain the image to be displayed.

Based on the same inventive concept, an embodiment of the present disclosure further provides a virtual reality system whose principle of solving a problem is similar to those of the processor and the virtual reality apparatus, thus an implementation of the virtual reality system may be referred to the implementation of the processor and the implementation of the virtual reality apparatus, and repeated description thereof is omitted herein.

FIG. 10 is a schematic structural diagram of a virtual reality system according to an embodiment of the present disclosure. As shown in FIG. 10, the virtual reality system according to the present embodiment may include any one of the processors 30 described above and any one of the virtual reality apparatuses 40 described above.

In the data transmission method and the related devices for the virtual reality system according to the embodiments of the present disclosure, the first image is obtained by capturing the portion of the image to be transmitted in the preset area, the portion of the image to be transmitted in the display area is compressed to obtain the second image, and the first image and the second image are transmitted in the certain order, for example, by the processor (i.e., the first processor). Since the data amount of the first image and the data amount of the second image are both smaller than the data amount of the image to be transmitted, the transmission bandwidth required is greatly reduced. Further, the virtual reality apparatus (e.g. a processor of the virtual reality apparatus) can stretch the received second image, merge the stretched second image with the received first image, and the resultant image to be displayed can meet the display requirement of the virtual reality system, such that the data transmission method according to each of the embodiments of the present disclosure can greatly reduce the transmission bandwidth and improve the user experience on the basis of meeting the display requirement of the virtual reality system.

It should be noted that a transmission bandwidth of the virtual reality system (e.g., a transmission bandwidth between the processor of the virtual reality system and the virtual reality apparatus of the virtual reality system) and the processing capacity of the processor of the virtual reality system (e.g., the capacity of the processor of the virtual reality system to render the image to be transmitted) tend to be factors that limit the performance of the virtual reality system. Accordingly, the processor may perform the processing as shown in FIG. 11, i.e., determine whether both the transmission bandwidth of the virtual reality system and the processing capacity of the processor meet the display requirements of the virtual reality apparatus (as shown in S601 of FIG. 11), and perform different image processing and different image transmission according to the determination results thereof (as shown in S602 to S605 of FIG. 11).

In a case where the processing capacity of the processor of the virtual reality system and the transmission bandwidth of the virtual reality system both meet the display requirements of the virtual reality apparatus (i.e., within a first time period (e.g., in the case where the refresh rate of the virtual reality apparatus is 90 Hz, the first time period is 1/90 seconds; in other words, the first time period is equal to a reciprocal of the refresh rate of the virtual reality apparatus), the transmission bandwidth of the virtual reality system can complete transmission of the image to be transmitted, and the processor of the virtual reality system can complete rendering of the image to be transmitted), the image processor directly transmits the image to be transmitted to the virtual reality apparatus for display at the refresh rate of the virtual reality apparatus and the resolution of the image to be transmitted, and it is not necessary to distinguish the first image and the second image from each other (as shown in S605 of FIG. 11).

Therefore, it should be understood that the foregoing-described embodiments correspond to the case where the transmission bandwidth of the virtual reality system cannot complete the transmission of the image to be transmitted and the processor of the virtual reality system cannot complete the rendering of the image to be transmitted within the first time period (as shown in S602 in FIG. 11).

In a case where the transmission bandwidth of the virtual reality system can complete the transmission of the image to be transmitted but the processor of the virtual reality system cannot complete the rendering of the image to be transmitted within the first time period, in an extended embodiment, the processor may first render the first image at a first rendering resolution and render the second image at a second rendering resolution less than the first rendering resolution, then stretch the second image (e.g., stretch the second image to have the same size as a size of the portion of the image to be transmitted in the display area), merge (e.g., splice) the first image and the stretched second image together according to gazed-at point (i.e., a point gazed at by a user) information, and then synchronously transmit the first image and the stretched second image which are merged together (as shown in S603 in FIG. 11).

In a case where the transmission bandwidth of the virtual reality system cannot complete the transmission of the image to be transmitted but the processor of the virtual reality system can complete the rendering of the image to be transmitted within the first time period, an extended embodiment, the processor may not need to use different rendering resolutions to render the first image and the second image, but directly render the portion of the image to be transmitted in the display area (see FIG. 3, in other words, directly perform high definition sampling on the portion of the image to be transmitted in the display area), then capture gazed-at point area (i.e., the first image) with a higher resolution from the portion of the rendered image to be transmitted in the display area according to the gazed-at point information, and compress the portion of the rendered image to be transmitted in the display area into the second image with a lower resolution (as shown in S604 of FIG. 11).

In addition, the present disclosure further provides the following extended embodiments, in which it should be understood that only differences between each of the expanded embodiments and the foregoing embodiments are described, and the similarities therebetween are omitted.

In an extended embodiment, for each of S602 and S604 of FIG. 11, during the periodical transmission in which k first images Q1 are transmitted continuously and then one second image Q2 is transmitted in sequence as shown in FIG. 4, where k is an integer greater than 1, if the virtual reality apparatus is in a moving state, the value of k may be reduced, i.e., the periodical transmission shown in FIG. 4 is changed to a periodical transmission in which M first images Q1 are transmitted continuously and then one second image Q2 is transmitted in sequence, where $1 \le M < k$. In this case, the processor also performs updating of the first image Q1 and the second image Q2 according to such a period. When the moving speed of the virtual reality apparatus is fast, a user may not be able to see a picture clearly at this time, so the processor may update and transmit the second image Q2 only, i.e., M is equal to 0 or 1 in this case.

In an extended embodiment, for each of S602 and S604 of FIG. 11, during the periodical transmission in which k first images Q1 are transmitted continuously and then one second image Q2 is transmitted in sequence as shown in FIG. 4, where k is an integer greater than 1, the processor may determine a similarity between any two adjacent second images Q2, and if the similarity is high (e.g., greater than a given threshold), it indicates that the overall scene is not greatly changed, in which case the first image Q1 may continue to be updated, i.e. the value of k is increased. If the similarity is decreased (e.g., is less than or equal to the given threshold), the update frequency of the first image Q1 may be decreased, i.e., the value of k is decreased. In the present embodiment, the processor 30 may further include an image determiner 303 (as shown in FIG. 12), which is configured to determine the similarity between the two adjacent second images Q2, increase the value of k in response to the similarity being greater than the given threshold, and decrease the value of k in response to the similarity being less than or equal to the given threshold.

Figure 13:
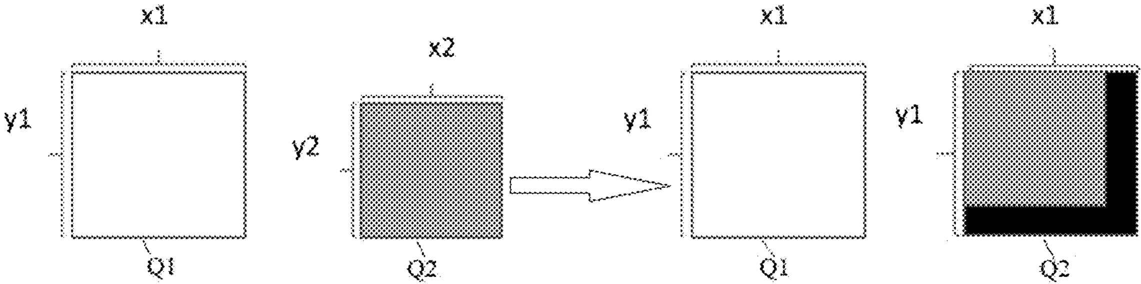
FIG. 13 is a schematic flowchart of filling black in one, which has a smaller resolution, of two images with different resolutions, according to an embodiment of the present disclosure.

In an extended embodiment, the resolution of each first image Q1 and the resolution of each second image Q2 may be different from each other, for example, in the display of the virtual reality apparatus (see FIG. 9). In the foregoing embodiments, the resolution of each first image Q1 and the resolution of each second image Q2 are set to be equal to each other to ensure that a connection protocol of a receiving terminal (e.g., the virtual reality apparatus) and a connection protocol of a transmitting terminal (e.g., the processor) do not need to re-handshake in case of intermediate transmission. Alternatively, if it is desired to avoid the occurrence of re-handshake and the resolution of each first image Q1 is greater than the resolution of each second image Q2, edges of each second image Q2 may be filled with black (i.e., may be blackened) before the second image Q2 is added to an image sequence, so that the resolution of each first image Q1 is equal to the resolution of each second image Q2 during transmission. The process of filling black (i.e., blackening) is as follows. In a case where the resolution of each first image Q1 is $x1*y1$ and the resolution of each second image Q2 is $x2*y2$, where $x1>x2$, and $y1>y2$ (as shown on the left side of the arrow in FIG. 13), the processor (e.g., the image processor of the processor) creates a full black image at the resolution of $x1*y1$, and then attaches the second image Q2 at the resolution of $x2*y2$ as a texture to the full black image from the upper left corner (because texture coordinates of an image start from the upper left corner), thereby filling black in the second image (i.e., obtaining the second image Q2 at the resolution of $x1*y1$, as shown on the right side of the arrow in FIG. 13). Further, when the virtual reality apparatus (e.g., the receiver 401 of the virtual reality apparatus 40 shown in FIG. 9) is to store the second image Q2 with the filled black in a memory, the resolution of the second image Q2 to be stored may be set to $x2*y2$ (i.e., the black filled in the second image Q2 is removed), and then the second image Q2 may be stored.

In some embodiments, the image to be transmitted may be stored in a memory (e.g., a third memory) in advance, and the processor may read the image to be transmitted from the third memory. The third memory and the processor may be integrated in a same (i.e., one single) device. Alternatively, the processor may obtain the image to be transmitted from an external device (e.g., a camera, a mobile phone, a computer, etc.), a network, a cloud server, etc. through wired communication or wireless communication.

Figure 12:
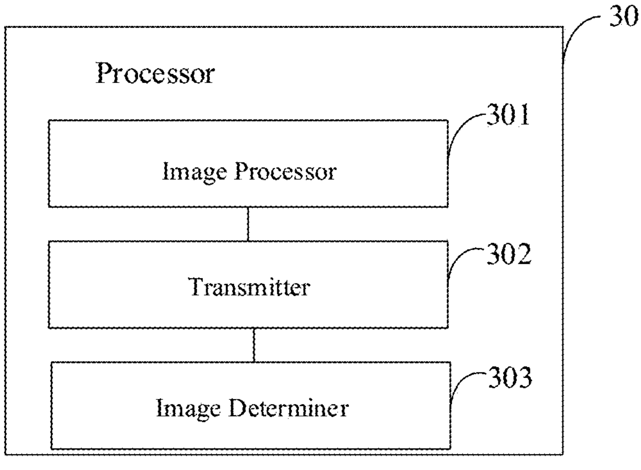
FIG. 12 is a schematic structural diagram of another processor according to an embodiment of the present disclosure.

In some embodiments, the image processor 301, the transmitter 302, and the image determiner 303 shown in FIGS. 8, 10 and 12 may be implemented by a combination of the processor and software. For example, the third memory has stored therein a computer program which, when executed by the processor, causes the processor to function as the image processor 301, the transmitter 302, and the image determiner 303.

In some embodiments, the receiver 401 and/or the image merger 402 shown in FIGS. 9 and 10 may be implemented by a combination of the processor (or another microprocessor, application processor, digital signal processor, etc.) and software. For example, the first memory and/or the second memory have stored therein a computer program, which, when executed by the processor (or the another microprocessor, application processor, digital signal processor, etc.), causes the processor (or the another microprocessor, application processor, digital signal processor, etc.) to function as the image receiver 401 and/or the image merger 402.

In an embodiment, rendering the preset area of the image to be transmitted may include: performing image sampling on the preset area of the image to be transmitted with the preset first resolution and the preset first field angle to obtain the first image, or performing image sampling on the preset area of the image to be transmitted with the preset first resolution, the preset first field angle, and a first refresh rate to obtain the first image. Rendering the display area of the image to be transmitted may include: performing image sampling on the display area of the image to be transmitted with the preset second resolution and the preset second field angle to obtain the second image, or performing image sampling on the display area of the image to be transmitted with the preset second resolution, the preset second field angle, and a second refresh rate to obtain the second image.

In the present disclosure, the term of "bandwidth" refers to the maximum data transmission speed per unit time of a transmission channel between an information source and an information destination, and is generally in unit of bit/s (bps). For example, in the case where the first processor is a processor of a virtual reality host communicating with the virtual reality apparatus, the bandwidth between the first processor and the virtual reality apparatus may be the maximum data transmission speed per unit time of the wired or wireless link between the processor of the virtual reality host and the virtual reality apparatus. In the case where the first processor is a processor of a cloud server, the bandwidth between the first processor and the virtual reality apparatus may be the maximum data transmission speed per unit time of the wired or wireless link between the first processor and the virtual reality apparatus. In the case where the first processor is a processor of the virtual reality apparatus, the bandwidth between the first processor and the virtual reality apparatus may be the maximum data transmission speed per unit time of a wired or wireless link between any two of the processor, the receiver 401, the image merger 402, and display 403 of the virtual reality apparatus (see FIG. 9).

In an embodiment, the second image includes position information, and the first image is merged with the stretched second image based on the position information. The position information is configured to characterize (or represent) information of a position of the first image as a partial area of the second image. Therefore, the first image can be merged (or spliced) with the stretched second image based on the position information to obtain the image to be displayed.

It will be apparent to those skilled in the art that various changes and modifications may be made to the present disclosure without departing from the spirit and scope of the present disclosure. Thus, it is intended that the present disclosure also encompass such changes and modifications if they fall within the scope of the appended claims and their equivalents.

What is claimed is:

1. A data transmission method for a virtual reality system, the data transmission method comprising:

performing, by a first processor, image sampling on an image to be transmitted to obtain a first image;

performing, by the first processor, image sampling on the image to be transmitted to obtain a second image;

transmitting, by the first processor, the first image and the second image to a virtual reality apparatus;

receiving the first image and the second image by the virtual reality apparatus and processing the first image and the second image by the virtual reality apparatus to obtain an image to be displayed; and displaying the image to be displayed by the virtual reality apparatus, wherein the performing, by the first processor, image sampling on the image to be transmitted to obtain the first image comprises: performing, by the first processor, image sampling on a preset area of the image to be transmitted with a preset first resolution and a preset first field angle to obtain the first image;

the performing, by the first processor, image sampling on the image to be transmitted to obtain the second image comprises: performing, by the first processor, image sampling on a display area of the image to be transmitted with a preset second resolution and a preset second field angle to obtain the second image, wherein the preset area is a portion of the display area;

the transmitting, by the first processor, the first image and the second image to the virtual reality apparatus comprises: transmitting, by the first processor, the first image and the second image to the virtual reality apparatus alternately and in a certain order;

the performing, by the first processor, image sampling on the preset area of the image to be transmitted with the preset first resolution and the preset first field angle to obtain the first image comprises: performing, by the first processor, image sampling on the preset area of the image to be transmitted with the preset first resolution, the preset first field angle, and a first refresh rate to obtain the first image; and the performing, by the first processor, image sampling on the display area of the image to be transmitted with the preset second resolution and the preset second field angle to obtain the second image comprises: performing, by the first processor, image sampling on the display area of the image to be transmitted with the preset second resolution, the preset second field angle, and a second refresh rate to obtain the second image, wherein the first field angle is less than the second field angle, and the first refresh rate is greater than or equal to the second refresh rate.

2. The data transmission method according to claim 1, wherein the first processor comprises any one of a processor of a virtual reality host communicating with the virtual reality apparatus, a processor of a cloud server, or a processor of the virtual reality apparatus.

3. The data transmission method according to claim 1, wherein the first resolution and the second resolution are equal to each other.

4. The data transmission method according to claim 1, wherein the performing, by the first processor, image sampling on the image to be transmitted to obtain the first image comprises: performing, by the first processor, image sampling on the preset area of the image to be transmitted with the preset first resolution and the preset first field angle to obtain the first image;

the performing, by the first processor, image sampling on the image to be transmitted to obtain the second image comprises: performing, by the first processor, image sampling on the display area of the image to be transmitted with the preset second resolution and the preset second field angle to obtain the second image, wherein the first resolution is greater than the second resolution, the first field angle is less than the second field angle, and the preset area is a portion of the display area; and the transmitting, by the first processor, the first image and the second image to the virtual reality apparatus comprises: stretching the second image, merging the first image with a stretched second image, and synchronously transmitting the first image and the stretched second image which are merged together to the virtual reality apparatus.

5. The data transmission method according to claim 1, wherein the performing, by the first processor, image sampling on the image to be transmitted to obtain the first image comprises: performing, by the first processor, image sampling on the display area of the image to be transmitted with the preset first resolution and the preset second field angle to obtain an intermediate image, and capturing a portion of the intermediate image in the preset area within the display area to obtain the first image;

the performing, by the first processor, image sampling on the image to be transmitted to obtain the second image comprises: compressing, by the first processor, the intermediate image with the preset second resolution to have a size of the preset area, to obtain the second image having the preset first field angle, wherein the first resolution is greater than the second resolution, and the first field angle is less than the second field angle; and the transmitting, by the first processor, the first image and the second image to the virtual reality apparatus comprises: transmitting, by the first processor, the first image and the second image to the virtual reality apparatus in the certain order.

6. The data transmission method according to claim 3, wherein the certain order comprises a periodical transmission in which k first images Q1 are transmitted continuously and then one second image Q2 is transmitted in sequence, where k is an integer greater than 1;

or the certain order comprises a periodical transmission in which M first images Q1 are transmitted continuously and then one second image Q2 is transmitted in sequence, where $1 \leq M < k$.

7. The data transmission method according to claim 5, wherein the certain order comprises a periodical transmission in which k first images Q1 are transmitted continuously and then one second image Q2 is transmitted in sequence, where k is an integer greater than 1;

or the certain order comprises a periodical transmission in which M first images Q1 are transmitted continuously and then one second image Q2 is transmitted in sequence, where $1 \leq M < k$.

8. The data transmission method according to claim 3, wherein the certain order comprises a periodical transmission in which k first images Q1 are transmitted continuously and then one second image Q2 is transmitted in sequence, where k is an integer greater than 1; and the first processor determines a similarity between any two adjacent second images, increases a value of k in response to the similarity being greater than a given threshold, and decreases the value of k in response to the similarity being less than or equal to the given threshold.

9. The data transmission method according to claim 5, wherein the certain order comprises a periodical transmission in which k first images Q1 are transmitted continuously and then one second image Q2 is transmitted in sequence, where k is an integer greater than 1; and the first processor determines a similarity between any two adjacent second images, increases a value of k in response to the similarity being greater than a given threshold, and decreases the value of k in response to the similarity being less than or equal to the given threshold.

10. The data transmission method according to claim 3, wherein the receiving the first image and the second image by the virtual reality apparatus and processing the first image and the second image by the virtual reality apparatus to obtain the image to be displayed comprises:

stretching the second image by the virtual reality apparatus, and merging the first image with a stretched second image by the virtual reality apparatus to obtain the image to be displayed.

11. A data transmission method for a virtual reality system, the data transmission method comprising:

performing image sampling on a preset area of an image to be transmitted with a preset first resolution and a preset first field angle to obtain a first image;

performing image sampling on a display area of the image to be transmitted with a preset second resolution and a preset second field angle to obtain a second image, wherein the first resolution and the second resolution are equal to each other, and the preset area is a portion of the display area; and transmitting the first image and the second image to a virtual reality apparatus alternately and in a certain order, wherein the performing image sampling on the preset area of the image to be transmitted with the preset first resolution and the preset first field angle to obtain the first image comprises: performing image sampling on the preset area of the image to be transmitted with the preset first resolution, the preset first field angle, and a first refresh rate to obtain the first image; and the performing image sampling on the display area of the image to be transmitted with the preset second resolution and the preset second field angle to obtain the second image comprises: performing image sampling on the display area of the image to be transmitted with the preset second resolution, the preset second field angle, and a second refresh rate to obtain the second image;

wherein the first field angle is less than the second field angle, and the first refresh rate is greater than or equal to the second refresh rate.

12. The data transmission method according to claim 11, wherein the first refresh rate and the second refresh rate are determined as follows:

the first refresh rate of the first image and the second refresh rate of the second image are determined according to a refresh rate of the virtual reality apparatus and attitude information of the virtual reality apparatus.

13. The data transmission method according to claim 11, wherein the transmitting the first image and the second image to the virtual reality apparatus in the certain order comprises:

arranging frames of the first image and the second image according to the first refresh rate and the second refresh rate to obtain an image sequence comprising the first image and the second image, and transmitting the image sequence to the virtual reality apparatus.

14. The data transmission method according to claim 11, wherein the performing image sampling on the preset area of the image to be transmitted with the preset first resolution and the preset first field angle to obtain the first image and the performing image sampling on the display area of the image to be transmitted with the preset second resolution and the preset second field angle to obtain the second image comprise:

adding flag bit information into the first image and the second image, respectively, wherein the flag information is configured to distinguish the first image and the second image from each other.

* * * * *